United States Patent [19]
Worrell et al.

[11] Patent Number: 6,036,223
[45] Date of Patent: Mar. 14, 2000

[54] HANDS FREE AIR BAG ELECTRICAL CONNECTOR ASSEMBLY

[75] Inventors: Barry Christian Worrell, Centerville; James Jeffrey Simpson, Fairborn, both of Ohio

[73] Assignee: General Motors Corpoartion, Detroit, Mich.

[21] Appl. No.: 09/005,809

[22] Filed: Jan. 12, 1998

[51] Int. Cl.$^7$ .................................................. B60R 21/16
[52] U.S. Cl. ........................................ 280/731; 280/728.2
[58] Field of Search ................................ 280/728.2, 731

[56] References Cited

U.S. PATENT DOCUMENTS 5,584,501 12/1996 Walters ................................ 280/728.2

*Primary Examiner*—Kenneth R. Rice
*Attorney, Agent, or Firm*—Kathryn A Marra

[57] ABSTRACT

An electrical connector assembly is provided for an air bag module mounted to a steering wheel. The air bag module includes an inflator and an air bag mounted to a base plate. The electrical connector assembly includes a first connector and second connector for interconnecting the inflator to an actuation control circuit. The first connector is attached to the air bag module and the second connector is attached to the steering wheel. Each of the connectors include a channel and a throughbore extending longitudinally therethrough. An electrical terminal is disposed in each of the channels to provide an electrical connection between the connectors when mated together. The electrical connector assembly further includes a fastener, preferably a stud, extending through the throughbores for locking the first and second connectors together and attaching the air bag module to the steering wheel. The stud also guides and aligns the connectors of the connector assembly to permit hands free mating of the connector assembly during the assembly of the air bag module to the steering wheel. The first connector includes a plurality of legs that slidably engage the air bag module and a spring member for urging the first connector away from the air bag module to insure full engagement with the second connector which is mounted firmly to the steering wheel.

22 Claims, 4 Drawing Sheets

HANDS FREE AIR BAG ELECTRICAL CONNECTOR ASSEMBLY

TECHNICAL FIELD

The present invention relates to a driver's side air bag for a motor vehicle and more particularly, to a drive side air bag module that provides hands free connection of an electrical connector assembly when mounting the air bag module to a steering wheel.

BACKGROUND OF THE INVENTION

Most passenger vehicles have a driver's side air bag mounted to the steering wheel. The air bag comprises a module that generally includes an air bag, an inflator, a base plate for mounting the air bag to the inflator, and a cover for enclosing the air bag. The inflator is electrically connected to control electronics through an electrical connector assembly having mating connectors. One connector of the connector assembly is attached to a pig tail that is connected to the inflator and the other connector of the connector assembly is attached to a pig tail extending from the steering column. The air bag module is secured to the base of the steering wheel by a plurality of fasteners.

During the installation of the air bag module to the steering wheel, the assembler must first enter the vehicle and mate the electrical connectors together. Once connected, the assembler must secure an attachment to the connector assembly to provide a connector positive assurance (CPA) device which provides a secondary device to insure connection of the electrical connectors. The air bag module is then secured to the steering wheel base by fastening it in place to complete the assembly process.

The number of steps and details to install the air bag module, from the assembler needing to enter the vehicle to handling of the connector assembly and attachment of the CPA device, increase the time and cost to assemble the driver's side air bag system.

SUMMARY OF THE INVENTION

This invention offers advantages and alternatives over the prior art by providing an electrical connector assembly having a first connector secured to a steering wheel and a second connector secured to an air bag module which provides for hands free interconnection of the electrical connectors mounting the air bag module to the steering wheel. Advantageously, the air bag module includes fasteners, preferably snap fit studs, that when aligned for engagement with the steering wheel, the electrical connectors are also aligned for mating. The attachment of the air bag module to the steering wheel by the fasteners functions as a connective positive assurance device for the electrical connector assembly, and thus eliminates the step of attaching a separate component to the assembly. Furthermore, one connector of the connector assembly is spring loaded to compensate for variations in tolerances to ensure full engagement with the mating connector.

These and other advantages are accomplished in a preferred form of the invention by providing an electrical connector assembly for an air bag module mounted to a steering wheel. The air bag module has an inflator and an air bag mounted to a backing plate. The electrical connector assembly includes a first connector and a second mating connector for interconnection. The first connector is attached to the air bag module and the second connector is attached to the steering wheel. Each of the connectors include a channel and a throughbore extending longitudinally therethrough. An electrical terminal is disposed in each of the channels to provide an electrical connection between the connectors when mated together. The electrical connector assembly further includes a fastener extending through the throughbores for locking the first and second connectors together and attaching the air bag module to the steering wheel.

In accordance with other preferred aspects of the invention, the first connector includes a plurality of legs for slidably engaging the backing plate of the air bag module and the second connector includes a plurality of legs having a resiliently flexible depending member having a detent at an end portion for snap fitting firmly to the steering wheel. Preferably, the electrical connector assembly includes a spring member for urging the first connector away from the air bag module to ensure full engagement of the connector assembly. The throughbore of the first connector also has an annular wall extending radially inward for engaging one end of a coil spring disposed coaxially about the fastener.

In addition, the fastener includes a stud member having a head portion at one end, preferably secured to the air bag module, and a slot disposed at an other end of the stud member for snap fitting to the steering wheel. Preferably, the stud includes a coil spring disposed coaxially about the stud, having one end attached to the stud adjacent the head portion.

BRIEF DESCRIPTION OF THE DRAWINGS

The present invention will now be described, by way of example only, with reference to the accompanying drawings in which.

DETAILED DESCRIPTION OF THE INVENTION

Figure 1:
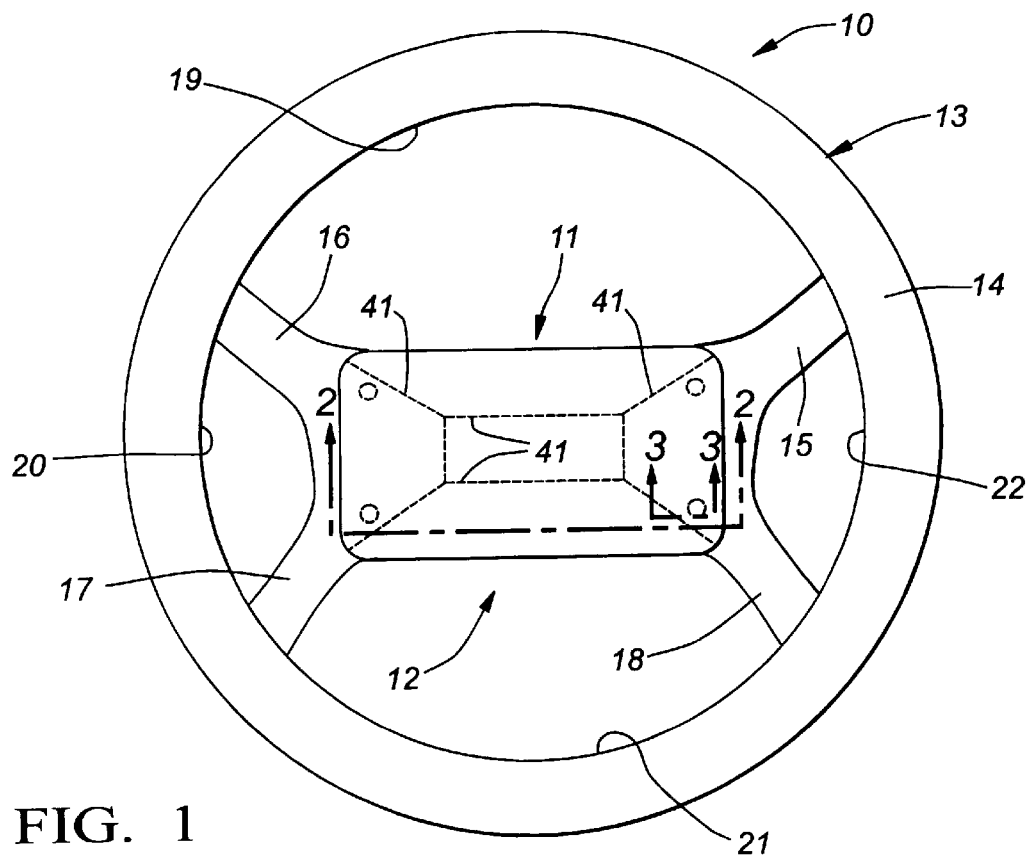
FIG. 1 is a top plan view of a driver's side air bag module embodying the present invention shown mounted to a steering wheel of a passenger vehicle.

Referring to FIG. 1, it is seen that a vehicle steering wheel and air bag module assembly, generally designated 10, includes an air bag module 11 suitably mounted on a central hub portion 12 of a vehicle steering wheel 13. The vehicle steering wheel 13 also includes a circular steering wheel rim portion 14 connected to the hub portion 12 by first, second, third spoke and fourth portions 15, 16, 17, 18 respectively, extending therebetween, as best shown in FIG. 1. Preferably, the steering wheel 13 includes first, second, third and fourth side spaces 19, 20, 21, 22 respectively, defined between the hub portion 12 and the rim portion 14 and separated by the spoke portions 15, 16, 17, 18. More specifically, the first side space 19 is located between the first and second spoke portions 15, 16, the second side space 20 is located between the second and third spoke portions 16, 17, the third side space 21 is located between the third and fourth spoke portions 17, 18, and the fourth side space 22 is located between the fourth and first spoke portions 18, 15.

Figure 2:
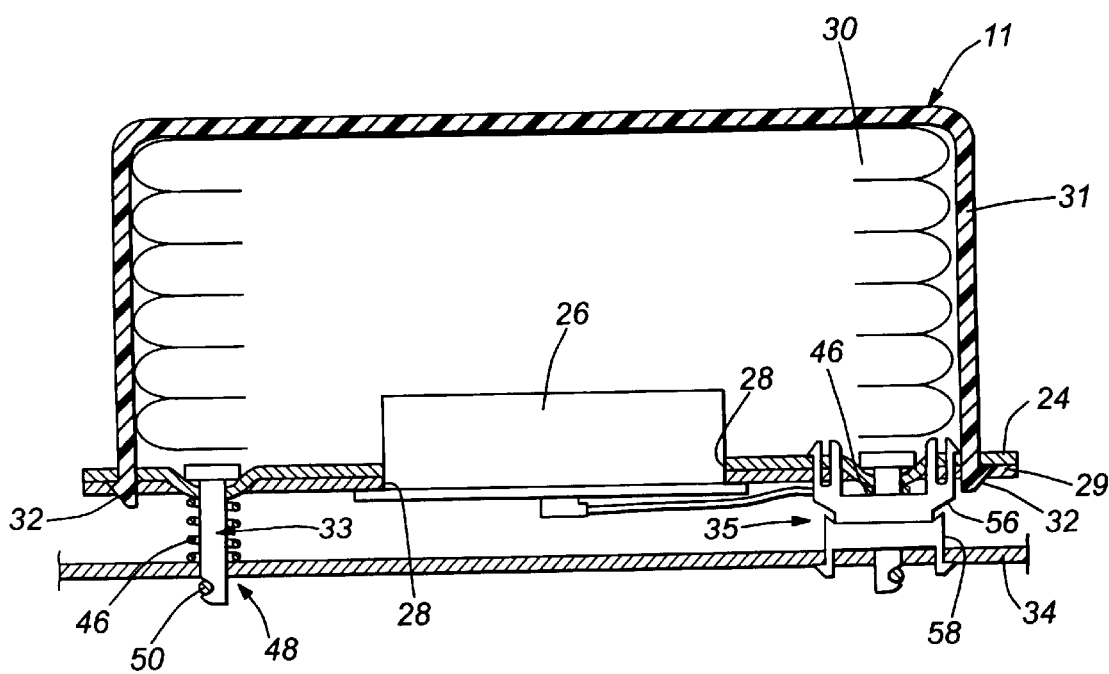
FIG. 2 is a sectional view of the driver's side air bag module of FIG. 1 mounted to the steering wheel taken along the line 2—2.

Referring also to FIG. 2, the air bag module 11 is mounted to the hub portion 12 of the vehicle steering wheel 13 and includes a roughly rectangular base plate 24, made of rigid material. The air bag module 11 also includes an inflator 26 for generating inflator gas upon the sensing of predetermined vehicle conditions. The inflator 26 is mounted within a central opening 28 of an annular backing plate 29. The inflator 26 may be of any conventional construction. The air bag module 11 further includes an air bag 30 made of a fabric material and connected to the base plate 24. Upon sensing of predetermined vehicle conditions, the air bag 30 is inflated by gas discharged by the inflator 26 in a well known manner.

In addition, the air bag module 11 includes an air bag cover 31 attached to the base plate 24 in a suitable manner, such as by fasteners 32. The cover 31 is preferably integrally molded of a single layer of plastic material and thus is relatively easy to manufacture. However, it will by appreciated that the cover 31 could also be comprised of more than one layer and could include an outer decorative cover layer, such as a urethane foam material. The cover 31 overlies the air bag 30 and inflator 26 and maintains the air bag 30 in a folded condition prior to air bag deployment. As shown in FIG. 1, an exemplary tear pattern defined by edges 41 is shown. The edges 41 define thinned sections of the air bag cover 31 which will tear during deployment of the air bag 30, as is well known in the art. It will be appreciated that the tear pattern shown in FIG. 1 is by way of example only and that other tear patterns may be employed with the present invention.

A plurality of studs 33 are mounted to the base plate 24 and extend downwardly to secure the air bag module assembly 10 to the steering wheel base 34. The backing plate 29 is secured to the bottom surface of the base plate 24. The electrical connection from the steering column (not shown) to the inflator 26 is provided through an electrical connector assembly 35.

Figure 3:
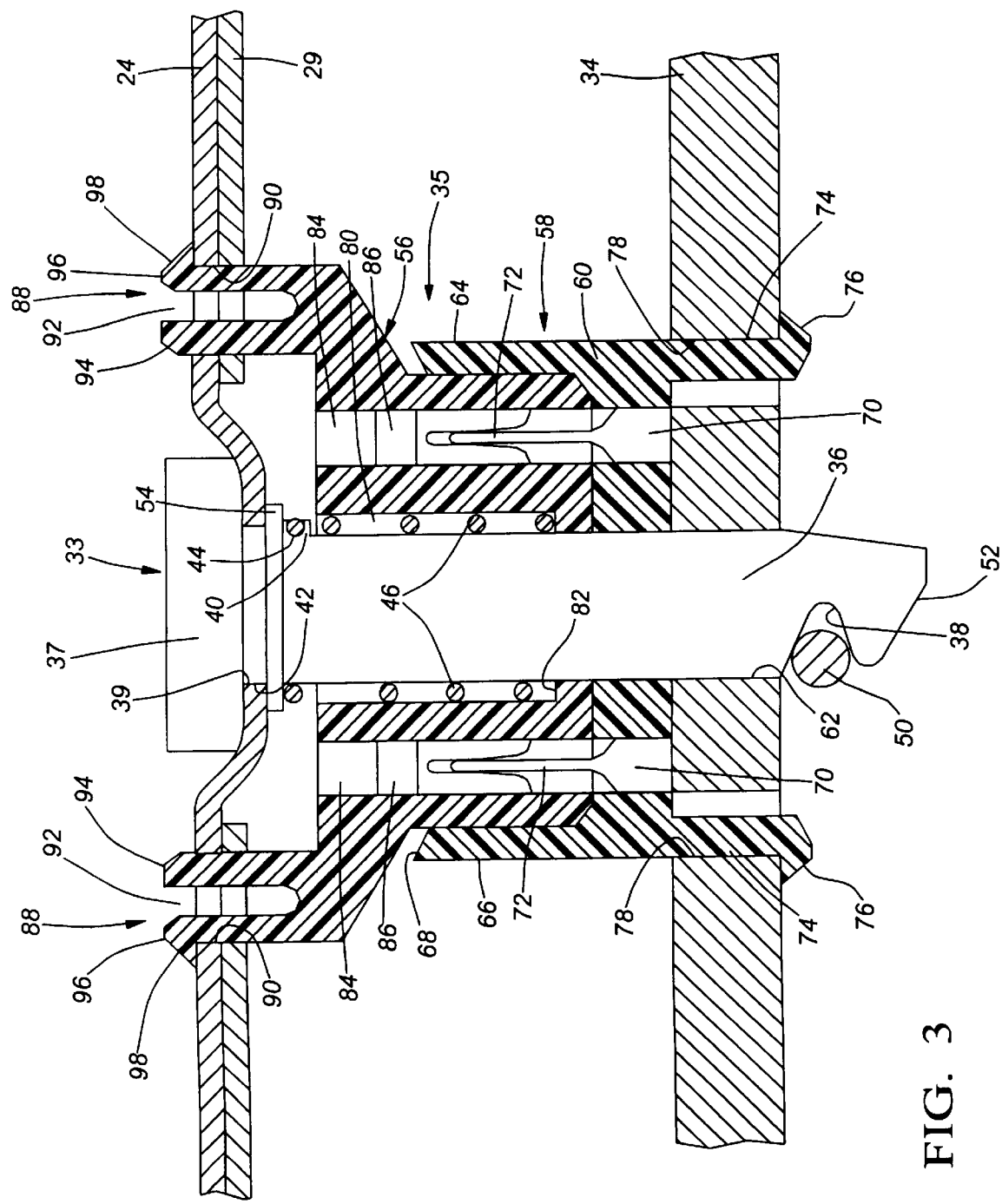
FIG. 3 is an expanded sectional view of an electrical connector assembly of FIG. 1 taken along the line 3—3.

As best shown in FIG. 3, the studs 33 include a cylindrical shank 36 having a head 37 disposed at one end and a V-shaped notch 38 opening radially outward at the other end. The stud 33 extends through a keyed opening 39 in the base plate 24. The upper portion 40 of the shank 36 is expanded radially and has a complementary flat surface 42 to mate with the keyed opening 39 of the base plate 24 to properly position the stud 33 for engagement with the steering wheel base 34. The expanded portion 40 of the shank 36 further has an annular groove 44 for retaining one end of a spring 46 coaxially about the shank 36. As shown at 48 in FIG. 2, the other end of the spring 46 engages the steering wheel base 34 to urge the air bag module 11 away from the steering wheel base 34 to support the air bag module 11 to the steering wheel 13. When the air bag module 11 is fully inserted into the steering wheel base 34, the notch 38 of the stud 33 engages a tab or spring wire 50 mounted below the steering wheel base 34. The tip 52 of the shank 36 is chamfered to displace the spring wire 50 sufficiently outward to engage the notch 38. The stud 33 is secured to the base plate 24 by a collar 54 that is expanded greater than the diameter of the keyed opening 39 in the base plate 24.

In FIG. 3, the stud 33 is shown passing through the electrical connector assembly 35 that comprises a male connector 56 and a female connector 58 for receiving the male connector 56. The female connector 58 has a generally rectangular body portion 60 having a central throughbore 62 disposed longitudinally therein for receiving the stud 33. The body portion 60 has a cavity 64 opening longitudinally upward for receiving the male connector 56. The cavity 64 is defined by outer walls 66 having end surfaces 68 chamfered inwardly to assist with locating and guiding of the male connector 56 into the cavity 64. A plurality of through channels 70 extend longitudinally in the female connector 58 for receiving and securing male electrical terminals 72 therein. A pair of resiliently flexible legs 74 extend downwardly from the female connector 58 for engaging the steering wheel base 34. The ends of each of the legs 74 have a rounded detent 76 that extend outwardly. The legs 74 are resiliently flexible to pass through bores 78 disposed in the steering wheel base 34 and snap lock the female connector 58 to the steering wheel base 34. The length of the legs 74 are substantially equal to the width of the steering wheel base 34 to insure the bottom surface of the female connector 58 is in fixed engagement with the top surface of the steering wheel base 34 when the legs 74 are snap fit thereto.

The male connector 56 has a stepped throughbore 80 disposed in registered relation with the throughbore 62 of the female connector 58 which are both in registered relation with the stud 33 attached to the base plate 24. The throughbore 80 of the male connector 56 steps radially inward to define an annular engagement wall 82 for engaging the free end of the coil spring 46 secured to the stud 33.

The male connector 56 includes a plurality of channels 84 for receiving and securing therein electrical terminals 86 for mating with the female connector 58. The electrical terminals 86 are female type for receiving the male electrical terminals 72 of the female connector 58. The male connector 56 slidably engages the base plate 24 and backing plate 29 of the air bag module 11 by a pair of opposing legs 88 that extend upwardly through opening 90. The legs 88 also extend laterally from the male connector 56 to provide sufficient clearance about the stud 33 when engaged to the air bag module 11. Each leg 88 includes a longitudinal slot 92 to form a guide member 94 and a retaining member 96. The guide member 94 engages the inner edge of the openings 90 to guide the longitudinal movement of the male connector 56 relative to the air bag module 11. The retaining member 96 has a rounded detent 98 extending outwardly for engagement with the top surface of the base plate 24. The retaining member 96 of the legs 88 are resiliently flexible to snap fit to the plates 24, 29 to retain the male connector 56 to the air bag module 11.

The legs 88 of the male connector 56 are slightly longer than the depth of the base plate 24 and backing plate 29, such that the top surface of the male connector 56 does not contact the bottom surface of the backing plate 29 when the detent 98 of the legs 88 engage the top surface of the base plate 24. The coil spring 46 disposed about the stud 33 is received by the throughbore 80 of the male connector 56. The free end of the spring 46 engages the annular wall 82 within the throughbore 80 and urges the male connector 56 downwardly to provide firm engagement with the female connector 58 to take up an additional space due to variations in tolerances of the components of the air bag module 11 and steering wheel 13.

The studs 33 provide a number of functions to enable hands free connection of the electrical connector assembly 35 when securing the air bag module 11 to the steering wheel 13. The studs 33 provide connector positive assurance (CPA) when the air bag module 11 is mounted to the steering wheel 13 and thus, eliminates the need to provide a separate discrete CPA device (not shown) as provided in the prior art and the step of attaching the CPA device to the connector assembly 35. The studs 33 also assist with aligning the male and female connector 56, 58 without having to handle the connector assembly 35. When the studs 33 are aligned for attachment to the steering wheel 13, the connectors 56, 58 are self-aligned for interconnection.

Figure 4:
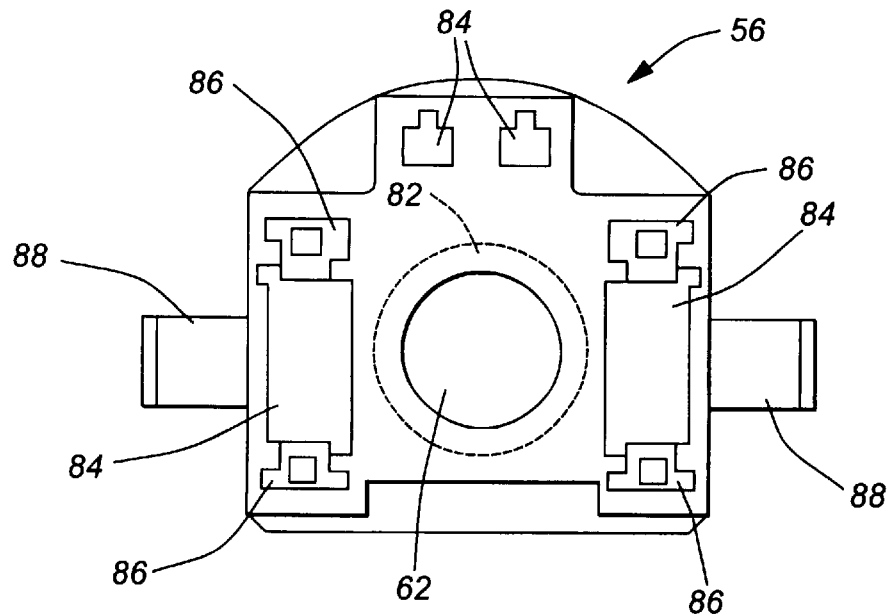
FIG. 4 is a bottom plan view of a male connector of the electrical connector assembly of FIG. 2.
Figure 5:
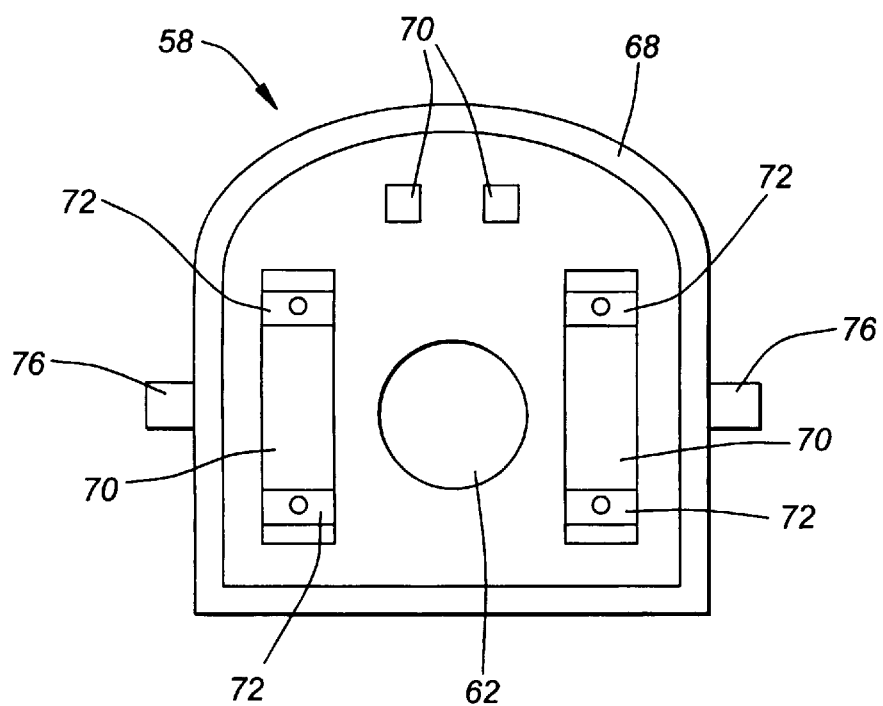
FIG. 5 is a top plan view of a female connector of the electrical connector assembly of FIG. 2.

Referring to FIGS. 4 and 5, the male and female connectors 56, 58 may include a plurality of electrical terminals 86, 72 disposed in channels 84, 70 to provide electrical interconnection to a variety of features mounted on the air bag module, such as cruise control, horn, temperature control for the climate control system, and volume control for the radio.

Figure 6:
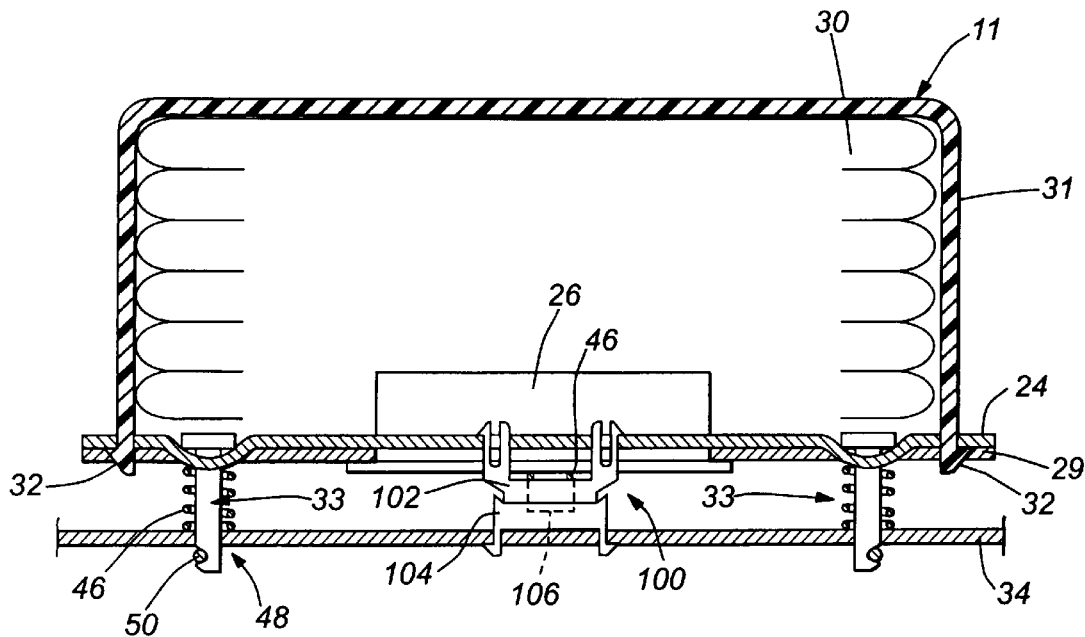
FIG. 6 is a sectional view of an alternative embodiment of the driver's side air bag module embodying the present invention taken along the line 2—2.
Figure 7:
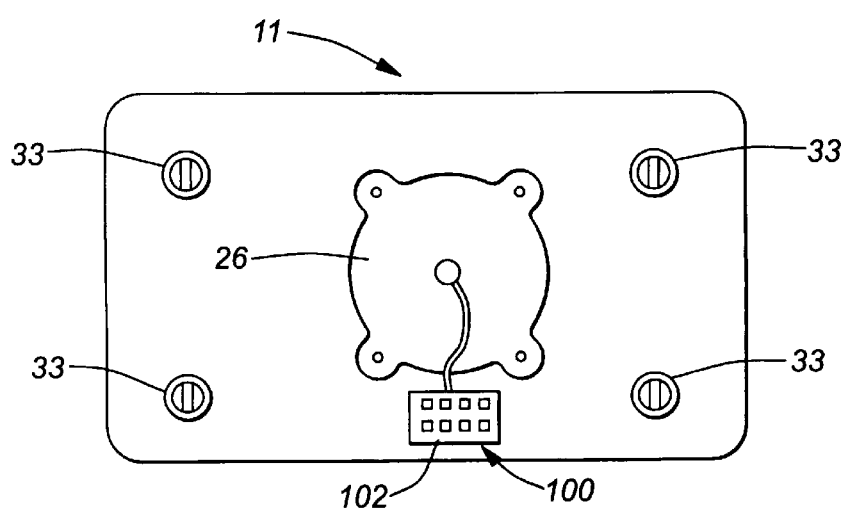
FIG. 7 is a bottom plan view of the alternative embodiment of the driver's side air bag module of FIG. 6.

Referring to FIGS. 6 and 7, an alternative embodiment of the present invention is shown wherein the electrical connector assembly 100 is disposed adjacent the studs 33 to provide hands free installation of the air bag module 11 to the steering wheel 13. The male and female connectors 102, 104 of the electrical connector assembly 100 are substantially the same are attached to the air bag module 11 and steering wheel 13 in substantially the same manner as shown in FIG. 2. In this embodiment the studs 33 still provide the alignment for the interconnection of the male and female connector 102, 104 of the electrical connector assembly 100 and the connector positive assurance.

The male connector 102 includes a cylindrical cavity 106 opening upwardly for receiving a coil spring 46. The ends of the coil spring 46 engage the male connector 102 and the base plate 24 of the air bag module 11 to urge the male connector 102 away from the air bag module 11. Similar to the embodiment shown in FIG. 2, the spring action acts to fully engage the male connector 102 with the female connector 104. One would recognize that any spring, such as a leaf spring and spring washer, may be used to urge the male connector 102 downward. Furthermore, one would recognize that the male connector 102 may also be mounted firmly to the bottom surface of the backing plate 29 similar to the mounting of the female connector 104 to the steering wheel plate 34, and thus eliminating the need for the spring.

In the preferred embodiments described hereinbefore, the male connector 56, 102 is mounted to the air bag module 11 and the female connector 58, 104 is mounted to the steering wheel 13. However, one would recognize that the position of the connectors may be reversed without departing from the present invention. Similarly, the position of the male and female electrical terminals 86, 72 may also be reversed.

It would be appreciated that the present invention may be used for an integrated steering wheel wherein the air bag module 11 and steering wheel 13 are molded together.

One would also appreciate that the studs 33 may be substituted with a plurality of a threaded screw-type fasteners with an alignment feature. Furthermore, the snap fit feature of the studs 33 may be replaced by a threaded portion to secure the air bag module 11 to the steering wheel 13.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An electrical connector assembly for an air bag module mounted to a steering wheel, the air bag module having an inflator and an air bag mounted to a base plate; the electrical connector assembly comprising:

a first connector attached to the air bag module, the first connector having a first channel and a first throughbore extending longitudinally therethrough, and an electrical terminal secured within the first channel;

a second connector attached to the steering wheel for interconnection with the first connector, the second connector having a second throughbore and a second channel extending longitudinally therethrough, the second throughbore disposed in registered relation with the first throughbore of the first connector and a second electrical terminal secured within the second channel for mating with the first electrical terminal; and a fastener for securing the first and second connectors together and attaching the air bag module to the steering wheel, the fastener extending through the first and second throughbores.

2. An electrical connector assembly, as defined in claim 1, wherein the first connector includes a plurality of legs for slidably engaging the base plate of the air bag module.

3. An electrical connector assembly, as defined in claim 2, further comprises a spring member for urging the first connector away from the air bag module.

4. An electrical connector assembly, as defined in claim 2, wherein the first throughbore has an annular wall extending radially inward; and the electrical connector assembly further includes a coil spring disposed coaxially about the fastener, the coil spring having a first end engaging the annular wall and a second end in engaging relationship with the air bag module to urge the first connector away from the air bag module.

5. An electrical connector assembly, as defined in claim 2, wherein each of the legs of the first connector include a resiliently flexible second depending member having a detent for snap fitting to the base plate.

6. An electrical connector assembly, as defined in claim 5, wherein each of the legs of the first connector include a second depending member for guiding the sliding movement of the first connector relative to the base plate.

7. An electrical connector assembly, as defined in claim 1, wherein the first electrical terminal is of the female type for receiving the second electrical terminal of the second connector.

8. An electrical connector assembly, as defined in claim 2, wherein the second connector comprises a plurality of legs having a resiliently flexible depending member having a detent at an end portion for snap fitting firmly to the steering wheel.

9. An electrical connector assembly, as defined in claim 1, wherein the first connector includes a plurality of channels, and a plurality of electrical terminals disposed within each of the channels and the second connector includes a plurality of channels and a plurality of electrical terminals disposed within each of the channels whereby the electrical terminals of the first connector engage the electrical terminals of the second connector.

10. An electrical connector assembly, as defined in claim 1, wherein the fastener comprises a stud member having a head portion at one end and a slot disposed at an other end of the stud member for snap fitting to the steering wheel.

11. An electrical connector assembly, as defined in claim 10, wherein the stud member is secured to the air bag module.

12. An electrical connector assembly, as defined in claim 10, wherein the stud comprises a coil spring disposed coaxially about the stud, the coil spring having one end attached to the stud adjacent the head portion.

13. An electrical connector assembly, as defined in claim 1, wherein the second connector includes a plurality of legs for slidably engaging the steering wheel and the first connector comprises a plurality of legs having a resiliently flexible depending member having a detent at an end portion for snap fitting firmly to the base plate.

14. An electrical connector assembly, as defined in claim 13, wherein the second throughbore has an annular wall extending radially inward; and the electrical connector assembly further includes a coil spring disposed coaxially about the fastener, the coil spring having a first end engaging the annular wall and a second end in engaging relationship with the steering wheel to urge the second connector away from the steering wheel.

15. An air bag assembly for mounting to a steering wheel; said air bag assembly comprising:

an electrical connector assembly including a first connector secured to the air bag module, the first connector having a first channel extending longitudinally therethrough, and a first electrical terminal secured within the first channel, and a second connector secured to the steering wheel for interconnection with the first connector, the second connector having a second channel extending longitudinally therethrough, and a second electrical terminal disposed in the second channel for mating with the first electrical terminal;

an air bag module including an air bag and inflator mounted to a base plate, and a plurality of fasteners extending outwardly from the base plate, wherein the fasteners lock the air bag module to the steering wheel and retain the first and second connectors together; and a spring member for urging the first connector away from the air bag module, the first connector including a plurality of legs for slidably engaging the air bag module.

16. An air bag assembly, as defined in claim 15, wherein the fasteners comprise a stud member having a head portion at one end and a slot disposed at an other end of the stud member for snap fitting to the steering wheel.

17. An air bag assembly, as defined in claim 16, wherein the stud member comprises a coil spring disposed coaxially thereabout, the coil spring having one end attached to the stud member adjacent the head portion.

18. An air bag assembly, as defined in claim 15, wherein the first connector includes a first throughbore extending longitudinally therethrough and the second connector includes a second throughbore extending longitudinally therethrough, the first and second throughbores disposed in registered relationship to permit the fastener to extend therethrough to lock the first and second connectors together.

19. An air bag assembly, as defined in claim 15, wherein the first and second connectors are secured to the air bag module and steering wheel, respectively, adjacent the fasteners.

20. An air bag assembly, as defined in claim 15, further comprises a spring member for urging the second connector away from the steering wheel, the second connector including a plurality of legs for slidably engaging the steering wheel.

21. An air bag assembly, as defined in claim 20, wherein the first connector includes a first throughbore extending longitudinally therethrough and the second connector includes a second throughbore extending longitudinally therethrough, the first and second throughbores disposed in registered relationship to permit the fastener to extend therethrough to lock the first and second connectors together.

22. An air bag assembly, as defined in claim 20, wherein the first and second connectors are secured to the steering wheel and air bag module, respectively, adjacent the fasteners.

* * * * *